United States Patent
Xu et al.

(10) Patent No.: US 10,855,375 B2
(45) Date of Patent: Dec. 1, 2020

(54) OPTICAL TRANSCEIVER ASSEMBLY

(71) Applicant: HUAWEI TECHNOLOGIES CO., LTD., Shenzhen (CN)

(72) Inventors: Zhiguang Xu, Shenzhen (CN); Yue Wen, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/381,096

(22) Filed: Apr. 11, 2019

(65) Prior Publication Data

US 2019/0238233 A1 Aug. 1, 2019

Related U.S. Application Data

(63) Continuation of application No. PCT/CN2016/101809, filed on Oct. 11, 2016.

(51) Int. Cl.
*H04B 10/00* (2013.01)
*H04B 10/40* (2013.01)
(Continued)

(52) U.S. Cl.
CPC .............. *H04B 10/40* (2013.01); *G02B 6/42* (2013.01); *H04B 10/25891* (2020.05); *H04B 10/506* (2013.01)

(58) Field of Classification Search
CPC .................................................. G02B 6/29365
See application file for complete search history.

(56) References Cited

U.S. PATENT DOCUMENTS 5,127,075 A * 6/1992 Althaus ................ G02B 6/4246
250/227.14
6,396,978 B1 * 5/2002 Grann ................ G02B 6/29358
385/24
(Continued)

FOREIGN PATENT DOCUMENTS

CN 1742218 A 3/2006
CN 202275833 U 6/2012
(Continued)

OTHER PUBLICATIONS

Shinji Yamashita, Guidebook for Optical Fiber Communications, Ed. 1, Imp. 3, Gijutsu-Hyohron Co., Ltd., May 25, 2005, pp. 226-228.

*Primary Examiner* — David C Payne
*Assistant Examiner* — Pranesh K Barua
(74) *Attorney, Agent, or Firm* — Kilpatrick Townsend & Stockton LLP

(57) ABSTRACT

Embodiments provide an optical transceiver assembly for resolving a problem that an optical assembly has a large size. The optical transceiver assembly may include a first cavity, a second cavity and WDMs. The first cavity may include at least two optical receivers, which may be configured to receive light of different wavelengths, respectively. The second cavity may include at least two optical transmitters, may be configured to emit light of different wavelengths, respectively. Each of the at least two optical receivers and each of the at least two optical transmitters may correspond to different WDMs, respectively. The WDM corresponding to one of the at least wo optical receivers can be configured to: separate, from light emitted from an optical fiber, light of a wavelength receivable by the corresponding optical receiver, transmit the light to the corresponding optical receiver, and reflect the other wavelengths.

11 Claims, 9 Drawing Sheets

(51) Int. Cl.
  *H04B 10/50*   (2013.01)
  *G02B 6/42*    (2006.01)
  *H04B 10/25*   (2013.01)

(56) References Cited

U.S. PATENT DOCUMENTS

| | | | |
|---|---|---|---|
| 6,563,976 B1* | 5/2003 | Grann | G02B 6/29311 |
| | | | 385/24 |
| 7,171,081 B1 | 1/2007 | Ko et al. | |
| 8,362,496 B1 | 1/2013 | Tu et al. | |
| 9,106,338 B2* | 8/2015 | Hui | H04B 10/40 |
| 9,564,569 B1* | 2/2017 | Wang | H01L 25/165 |
| 2001/0012767 A1* | 8/2001 | Kim | G02B 6/4246 |
| | | | 455/73 |
| 2002/0171914 A1* | 11/2002 | Meli | H04B 10/2503 |
| | | | 359/333 |
| 2004/0005115 A1* | 1/2004 | Luo | G02B 6/29367 |
| | | | 385/24 |
| 2004/0101259 A1 | 5/2004 | Kilian | |
| 2004/0105161 A1* | 6/2004 | Tatum | G02B 27/145 |
| | | | 359/634 |
| 2005/0002672 A1* | 1/2005 | Sakai | H04B 10/25073 |
| | | | 398/85 |
| 2006/0078252 A1* | 4/2006 | Panotopoulos | G02B 6/29367 |
| | | | 385/24 |
| 2008/0131129 A1 | 6/2008 | Bouda | |
| 2010/0226649 A1 | 9/2010 | Cheng et al. | |
| 2011/0058771 A1 | 3/2011 | Lee et al. | |
| 2012/0269516 A1* | 10/2012 | Liu | H04B 10/2503 |
| | | | 398/72 |
| 2013/0058617 A1 | 3/2013 | Chan et al. | |
| 2013/0287407 A1 | 10/2013 | Pan et al. | |
| 2013/0330080 A1 | 12/2013 | Li et al. | |
| 2014/0126909 A1* | 5/2014 | Song | H04J 14/06 |
| | | | 398/65 |
| 2014/0133862 A1 | 5/2014 | Fujimura et al. | |
| 2014/0219660 A1* | 8/2014 | Zhu | H04J 14/0282 |
| | | | 398/67 |
| 2014/0341580 A1 | 11/2014 | Wang et al. | |
| 2015/0177526 A1* | 6/2015 | Zhang | H04J 14/00 |
| | | | 359/638 |
| 2016/0004020 A1 | 1/2016 | Shao et al. | |
| 2016/0004920 A1* | 1/2016 | Armstrong-Crews | |
| | | | G03B 35/00 |
| | | | 348/46 |
| 2016/0050019 A1 | 2/2016 | Gothoskar et al. | |
| 2016/0195677 A1* | 7/2016 | Panotopoulos | G02B 6/4214 |
| | | | 250/227.23 |
| 2016/0197697 A1 | 7/2016 | Bonk et al. | |
| 2016/0315698 A1* | 10/2016 | Zhou | H04J 14/0282 |
| 2016/0327746 A1* | 11/2016 | Mathai | G02B 6/29367 |
| 2018/0052284 A1* | 2/2018 | Matres | G02B 1/11 |

FOREIGN PATENT DOCUMENTS

| | | |
|---|---|---|
| CN | 202334536 U | 7/2012 |
| CN | 203385904 U | 1/2014 |
| CN | 103782212 A | 5/2014 |
| CN | 204009151 U | 12/2014 |
| CN | 104914519 A | 9/2015 |
| CN | 105247400 A | 1/2016 |
| CN | 105637784 A | 6/2016 |
| EP | 3065314 A1 | 9/2016 |
| JP | 2002170984 A | 6/2002 |
| JP | 2004200279 A | 7/2004 |
| JP | 2010175875 A | 8/2010 |
| JP | 2012063460 A | 3/2012 |
| JP | 2012238646 A | 12/2012 |
| JP | 2013140258 A | 7/2013 |
| JP | 2013142815 A | 7/2013 |
| JP | 2014095843 A | 5/2014 |
| KR | 20110026368 A | 3/2011 |
| WO | 2013036945 A1 | 3/2013 |
| WO | 2015112169 A1 | 7/2015 |

\* cited by examiner

OPTICAL TRANSCEIVER ASSEMBLY

CROSS-REFERENCE TO RELATED APPLICATIONS

This application is a continuation of International Application No. PCT/CN2016/101809, filed on Oct. 11, 2016, the disclosure of which is hereby incorporated by reference in its entirety.

TECHNICAL FIELD

The present invention relates to the technical field of optical fiber communication, and in particular, to an optical transceiver assembly.

BACKGROUND

Currently, a passive optical network (PON) system includes one optical line terminal (OLT) located at a central office, one optical distribution network (ODN) used for splitting/coupling or multiplexing/demultiplexing, and a plurality of optical network units (ONU). The OLT is connected to the plurality of ONUs by using the ODN. An optical transceiver assembly is a critical device in the OLT in the passive optical network system and is configured to send and receive an optical signal.

With increasing bandwidth requirements of users and ongoing development of passive optical networks, a gigabit passive optical network (GPON) and a 10 gigabit passive optical network (XGPON) emerge. A downlink bandwidth of the GPON is 2.5 Gbps, and an uplink bandwidth of the GPON is 1.25 Gbps. A downlink bandwidth of the XGPON is 10 Gbps, and an uplink bandwidth of the XGPON is 2.5 Gbps. A downlink wavelength of the GPON is 1490 nm, and an uplink wavelength of the GPON is 1310 nm. A downlink wavelength of the XGPON is 1577 nm, and an uplink wavelength of the XGPON is 1270 nm. Therefore, a wavelength division multiplexer (WDM) is added at an OLT end to enable the XGPON and the GPON to coexist.

When the XGPON and the GPON coexist, an optical assembly in an existing arrangement has a structure shown in FIG. 1. The optical assembly includes an XGPON transmitter (Tx), an XGPON receiver (Rx), a GPON Tx, and a GPON Rx. The XGPON Tx, the XGPON Rx, the GPON Tx, and the GPON Rx are all independent devices, and are then assembled with a WDM 1, a WDM 2, and a WDM 3. In the structure of the optical assembly shown in FIG. 1, each Tx and each Rx are packaged independently, and a layout is incompact. As a result, the optical assembly has a relatively large size.

SUMMARY

Embodiments of the present invention provide an optical transceiver assembly, to resolve problems that an optical assembly has a scattered layout and the optical assembly has a large size in the prior art.

An embodiment of the present invention provides an optical transceiver assembly, including:

a first cavity, where the first cavity includes at least two optical receivers, and the at least two optical receivers are configured to receive light of different wavelengths, respectively;

a second cavity, where the second cavity includes at least two optical transmitters, and the at least two optical transmitters are configured to emit light of different wavelengths, respectively; wavelengths of light received by the at least two optical receivers are different from wavelengths of light emitted by the at least two optical transmitters;

each optical receiver and each optical transmitter correspond to different wavelength division multiplexers WDMs, respectively;

the WDM corresponding to the optical receiver is configured to: separate, from light emitted from an optical fiber, light of a wavelength that can be received by the corresponding optical receiver, transmit the light to the corresponding optical receiver, and reflect the other wavelengths; and the WDM corresponding to the optical transmitter is configured to: transmit light of a wavelength emitted by the corresponding optical transmitter, and reflect light of the other wavelengths emitted from the optical fiber; and an optical reflection component, configured to totally reflect the light transmitted or reflected from the WDMs.

The optical reflection component may be a total reflector.

In the optical transceiver assembly provided in this embodiment of the present invention, the transmitters and the receivers are respectively placed together in two different cavities, so that an optical assembly has a more compact structure, and in addition, mutual crosstalk between a transmit signal and a receive signal is avoided.

The first cavity and the second cavity in this embodiment of the present invention may be airtight package cavities, to avoid mutual crosstalk between a transmit signal and a receive signal.

Optionally, the optical transceiver assembly may further include:

lenses corresponding to each optical receiver and each optical transmitter, respectively, where the lens corresponding to the optical receiver is disposed in the first cavity, and is configured to transmit, to the optical receiver, the light emitted from the WDM corresponding to the optical receiver; and the lens corresponding to the optical transmitter is disposed in the second cavity, and is configured to transmit, to the WDM corresponding to the optical receiver, the light emitted by the optical transmitter.

The light emitted by the optical transmitter is transmitted through the lens corresponding to the optical transmitter, and is then transmitted through one corresponding WDM to reach the optical fiber; or the light emitted by the optical transmitter is transmitted through the lens corresponding to the optical transmitter, is then transmitted through one corresponding WDM, and is then reflected by at least one WDM of the other WDMs and the optical reflection component to reach the optical fiber; and the light received by the optical receiver is emitted from the optical fiber, is transmitted through one WDM corresponding to the optical receiver, and is transmitted through the lens corresponding to the optical receiver to reach the optical receiver; or is emitted from the optical fiber, is reflected from at least one WDM and the optical transmission component, is then transmitted through one WDM corresponding to the optical receiver, and is transmitted through the lens corresponding to the optical receiver to reach the optical receiver.

In a possible design, the first cavity and the second cavity are connected by using a common cavity wall.

Optionally, the common cavity wall is a metal plate or a ceramic plate.

If the first cavity and the second cavity are connected by using the common cavity wall, in the first cavity, a partial cavity wall on a side near the WDM corresponding to the optical receiver is a transparent plate, and the transparent plate in the first cavity is configured to transmit, to the optical receiver, the light transmitted from the WDM corresponding to the optical receiver; and in the second cavity, a partial cavity wall on a side near the WDM corresponding to the optical transmitter is a transparent plate, and the transparent plate in the second cavity is configured to transmit, to the WDM corresponding to the optical transmitter, the light emitted by the optical transmitter.

If the first cavity and the second cavity are connected by using the common cavity wall, in the first cavity, ceramic is disposed on a cavity wall on a side far away from the WDM corresponding to the optical receiver, metal pins are disposed on the ceramic in the first cavity, the metal pins are implanted in the first cavity by using a vias in the ceramic and are connected to one end of a lead disposed in the first cavity, and the other end of the lead in the first cavity is connected to the optical receiver; and in the second cavity, ceramic is disposed on a cavity wall on a side far away from the WDM corresponding to the optical transmitter, metal pins are disposed on the ceramic in the first cavity, the metal pins are implanted in the second cavity by using a vias in the ceramic and are connected to one end of a lead disposed in the second cavity, and the other end of the lead in the second cavity is connected to the optical transmitter.

By using the foregoing design, mutual interference between an electrical signal in the first cavity and an electrical signal in the second cavity can be avoided.

Optionally, the ceramic plate used as the common cavity wall between the first cavity and the second cavity is integrally connected to the ceramic in the first cavity and the ceramic in the second cavity.

By using the foregoing design, the ceramic is formed integrally and can be secured easily.

If the first cavity and the second cavity are connected by using the common cavity wall, all the WDMs and the optical reflection component are all disposed outside the first cavity and the second cavity.

In another possible design, the first cavity, all the WDMs, and the optical reflection component are all disposed in the second cavity;

in the first cavity, a partial cavity wall on a side near the WDM corresponding to the optical receiver is a transparent plate, and the transparent plate in the first cavity is configured to transmit, to the optical receiver, the light emitted from the WDM corresponding to the optical receiver; and in the second cavity, a partial cavity wall on a side near the optical reflection component is a transparent plate, and the transparent plate in the second cavity is configured to transmit, to the WDM, the light emitted from the optical fiber, or is configured to transmit, to the optical fiber, the light transmitted or reflected from the WDM.

If the first cavity, all the WDMs, and the optical reflection component are all disposed in the second cavity, optionally, in the second cavity, ceramic is disposed on a cavity wall on a side far away from the optical reflection component, and the ceramic includes a first part and a second part;

metal pins are disposed on the first part, the metal pins on the first part are implanted in the second cavity by using a vias in the first part and are connected to one end of a lead disposed in the second cavity, and the other end of the lead in the second cavity is connected to the optical transmitter;

the second part is used as a partial cavity wall, on a side far away from the WDM corresponding to the optical receiver, of the first cavity, metal pins are disposed on the second part, the metal pins on the second part are implanted in the first cavity by using a vias in the second part and are connected to one end of a lead disposed in the first cavity, and the other end of the lead in the first cavity is connected to the optical receiver.

The second cavity may be disposed on the ceramic extending from the first cavity, so that the lead connected to the metal pins can pass through a lower surface of a layer of the ceramic, then enters an upper surface of the ceramic in the second cavity by using a vias in the ceramic, and is then connected to the optical transmitter. In this way, an electrical signal in the second cavity can be prevented from being leaked into the first cavity to interfere with a signal in the first cavity.

In still another possible design, the second cavity, all the WDMs, and the optical reflection component are disposed in the first cavity;

in the second cavity, a partial cavity wall on a side near the WDM corresponding to the optical transmitter is a transparent plate, and the transparent plate in the second cavity is configured to transmit, to the WDM corresponding to the optical transmitter, the light emitted by the optical transmitter; and in the first cavity, a partial cavity wall on a side near the optical reflection component is a transparent plate, and the transparent plate in the first cavity is configured to: transmit, to the WDM, the light emitted from the optical fiber or transmit, to the optical fiber, the light emitted from the WDM.

In the second cavity, if all the WDMs and the optical reflection component are disposed in the first cavity, optionally, in the first cavity, ceramic is disposed on a cavity wall on a side far away from the WDM corresponding to the optical receiver, and the ceramic in the first cavity includes a first part and a second part;

metal pins are disposed on the first part, the metal pins on the first part are implanted in the first cavity by using a vias in the first part and are connected to one end of a lead disposed in the first cavity, and the other end of the lead in the first cavity is connected to the optical receiver; and the second part is used as a partial cavity wall, on a side far away from the WDM corresponding to the optical transmitter, of the second cavity, metal pins are disposed on the second part, the metal pins on the second part are implanted in the second cavity by using a vias in the second part and are connected to one end of a lead disposed in the second cavity, and the other end of the lead in the second cavity is connected to the optical transmitter.

The first cavity may be disposed on the ceramic extending from the second cavity, so that the lead of the metal pins can pass through a lower surface of a layer of the ceramic, then enters an upper surface of the ceramic in the first cavity by using a vias in the ceramic, and is then connected to a receiver. In this way, an electrical signal in the first cavity can be prevented from being leaked into the second cavity to interference with the second cavity.

In a possible design, a semiconductor cooler may be attached on a side of the optical transmitter.

DESCRIPTION OF EMBODIMENTS

To make the objectives, technical solutions, and advantages of the present invention clearer, the following further describes the present invention in detail with reference to the accompanying drawings. Apparently, the described embodiments are merely some rather than all of the embodiments of the present invention. All other embodiments obtained by persons of ordinary skill in the art based on the embodiments of the present invention without creative efforts shall fall within the protection scope of the present invention.

Figure 1:
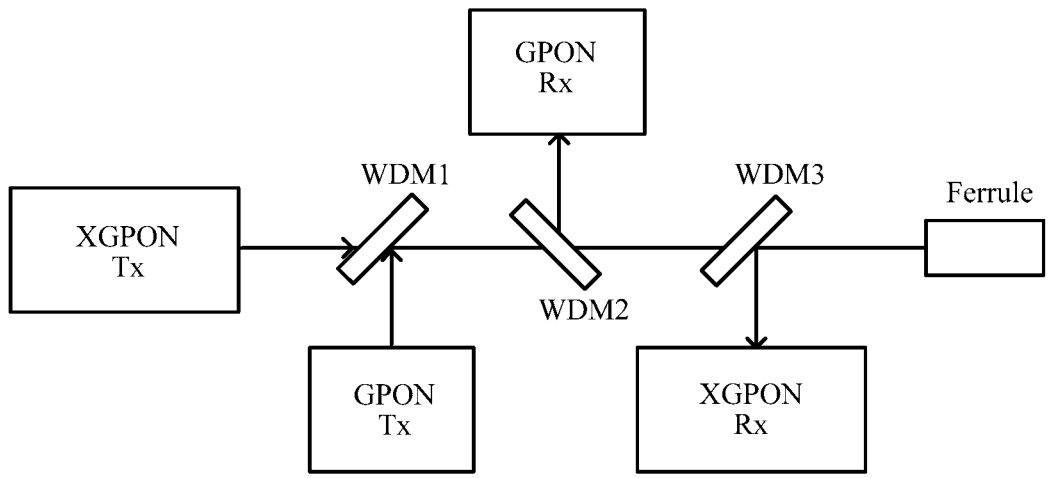
FIG. 1 is a schematic structural diagram of an optical transceiver assembly provided in the prior art.
Figure 2:
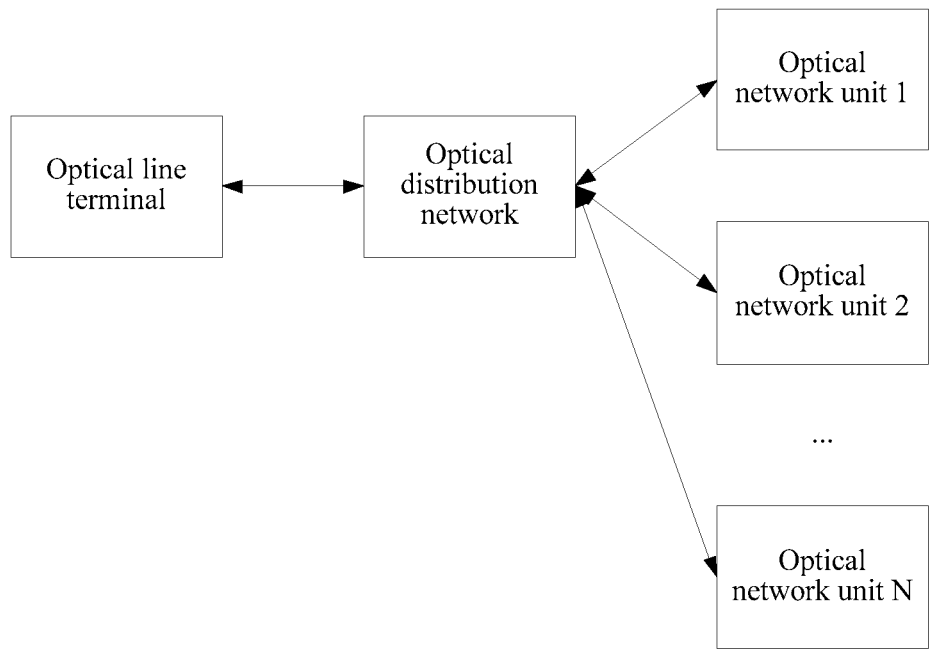
FIG. 2 is a schematic diagram of an architecture of a PON system according to an embodiment of the present invention.

An optical transceiver assembly provided in an embodiment of the present invention is applied to a PON system, and may be applied to a system in which a GPON and an XGPON coexist. FIG. 2 is a diagram of an architecture of the PON system. The PON system includes one OLT, one ODN, and a plurality of ONUs. The OLT is connected to the plurality of ONUs by using the ODN.

Figure 3:
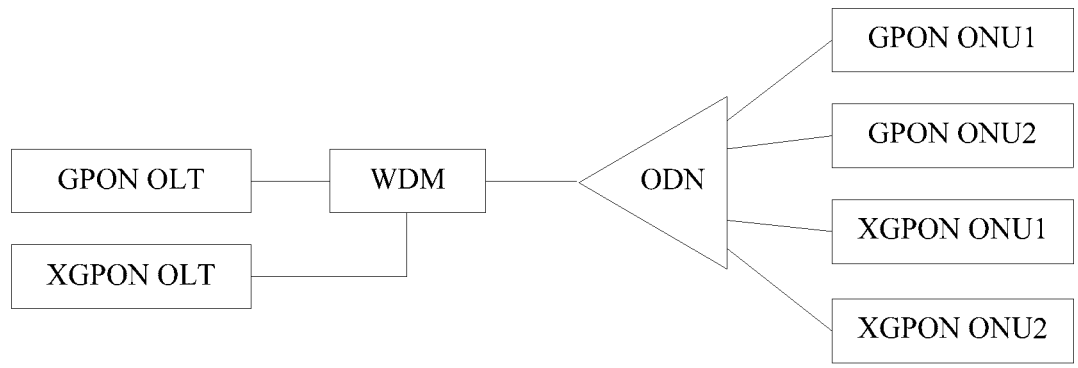
FIG. 3 is a schematic diagram of an architecture of another PON system according to an embodiment of the present invention.

FIG. 3 is a schematic diagram of an architecture of a system in which a GPON and an XGPON coexist. A passive device of a WDM is added at an OLT end. An XGPON OLT and a GPON OLT are connected to branch ports of the WDM, respectively. A common port of the WDM is connected to an ODN. In addition, an ONU whose bandwidth needs to be upgraded is replaced with an XGPON ONU. A downlink rate in an XGPON system is 10 Gbps and greater than a downlink rate of the GPON. Therefore, an average bandwidth for users of the XGPON is greater than that for users of the GPON. This upgrade solution in which the GPON and the XGPON coexist does not require a change to the ODN and has minimum impact on the system.

Figure 4:
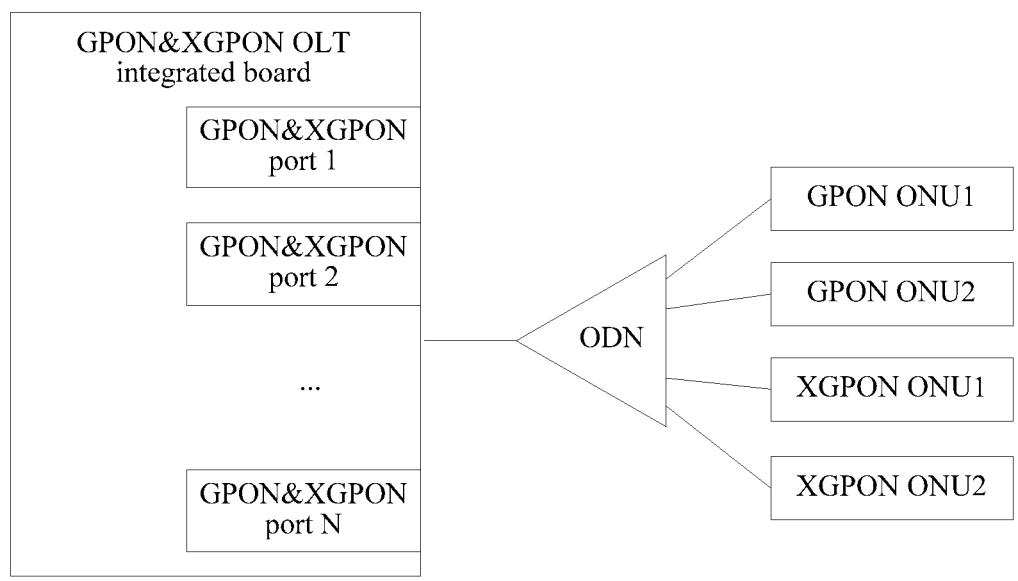
FIG. 4 is a schematic diagram of an architecture of still another PON system according to an embodiment of the present invention.

Based on the foregoing upgrade, a placement space is arranged for an added WDM device in a given equipment room in an office. The given equipment room may have many GPON and XGPON ports, and the upgrade requires a large quantity of WDM devices and requires a very large space. When a cabinet or an equipment room has a limited space, it may be considered to use a board that integrates a GPON function and an XGPON function. As shown in FIG. 4, each port in an OLT supports the GPON function and the XGPON function. Both a GPON ONU and an XGPON ONU can communicate with this port. In this way, an external WDM device does not need to be used.

Figure 5:
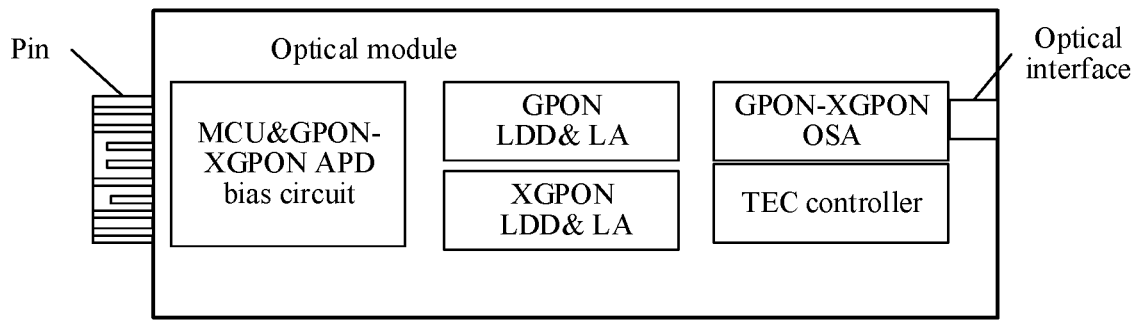
FIG. 5 is a schematic diagram of an optical module according to an embodiment of the present invention.

In a system shown in FIG. 4, the OLT needs to use an optical module that supports both a GPON function and an XGPON function. A structure of the optical module is shown in FIG. 5. The optical module includes a GPON-XGPON optical sub assembly (OSA) and related drive and control circuits such as a micro controller unit (MCU), an avalanche photo diode (APD) bias (APD bias) circuit, a laser diode driver (LDD), a limiting amplifier (LA), and a thermoelectric cooler (TEC) controller (TEC Controller). The optical transceiver assemblies are most critical and determine performance of the optical module or even the entire system.

Based on this, an embodiment of the present invention provides an optical transceiver assembly, to resolve problems that an optical assembly has a scattered layout and the optical assembly has a large size in the prior art.

Figure 6:
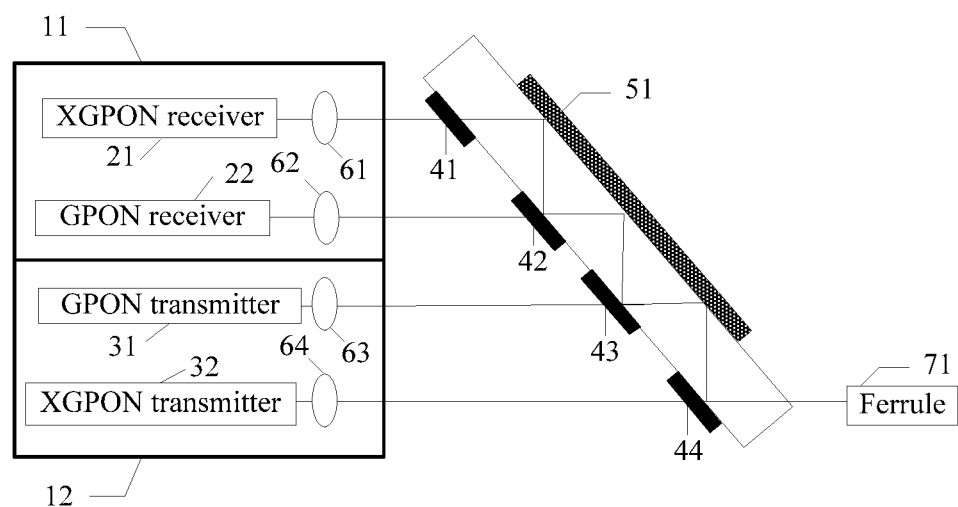
FIG. 6 is a schematic diagram 1 of an optical transceiver assembly according to an embodiment of the present invention.

FIG. 6 is a schematic diagram of an optical transceiver assembly according to an embodiment of the present invention. FIG. 6 shows only an example, and thus structures and a quantity of devices are not specifically limited. The optical transceiver assembly shown in FIG. 6 includes two cavities, namely, a first cavity 11 and a second cavity 12. The first cavity includes at least two optical receivers. The at least two optical receivers are configured to receive light of different wavelengths, respectively. The second cavity includes at least two optical transmitters. The at least two optical transmitters are configured to emit light of different wavelengths, respectively. Wavelengths of light received by the at least two optical receivers are different from wavelengths of light emitted by the at least two optical transmitters.

The first cavity 11 and the second cavity 12 in this embodiment of the present invention may be airtight package cavities.

This embodiment of the present invention is described by using an example in which the optical transceiver assembly includes two optical receivers and two optical transmitters. The two optical receivers are an XGPON receiver 21 and a GPON receiver 22. The two optical transmitters are a GPON transmitter 31 and an XGPON transmitter 32.

The optical transceiver assembly further includes at least four WDMs. In this embodiment, as shown, each optical receiver and each optical transmitter correspond to different WDMs, respectively.

The WDM corresponding to the optical receiver is configured to: separate, from light emitted from an optical fiber, light of a wavelength that can be received by the corresponding optical receiver, transmit the light to the corresponding optical receiver, and reflect the other wavelengths. The WDM corresponding to the optical transmitter is configured to: transmit light of a wavelength emitted by the corresponding optical transmitter, and reflect light of the other wavelengths emitted from the optical fiber. In FIG. 6, the XGPON receiver 21 corresponds to a WDM 41, the GPON receiver 22 corresponds to a WDM 42, the GPON transmitter 31 corresponds to a WDM 43, and the XGPON transmitter 32 corresponds to a WDM 44.

The optical transceiver assembly further includes an optical reflection component 51. The optical reflection component 51 is configured to totally reflect the light transmitted or reflected from the WDMs.

In this embodiment, the at least four WDMs and the optical reflection component 51 are combined to implement a wavelength division multiplexing function. That is, in this embodiment, light of a plurality of wavelengths emitted by the at least two optical transmitters is multiplexed to the optical fiber, and light of a plurality of wavelengths emitted from the optical fiber is demultiplexed to the at least two optical receivers.

In the optical transceiver assembly provided in this embodiment of the present invention, the transmitters and the receivers are respectively placed together in two different cavities, so that an optical assembly has a more compact structure, and in addition, mutual crosstalk between a transmit signal and a receive signal is avoided.

In some embodiments, the optical transceiver assembly may further include lenses corresponding to each optical receiver and each optical transmitter, respectively. The lens corresponding to the optical receiver is disposed in the first cavity 11, and is configured to transmit, to the optical receiver, the light emitted from the WDM corresponding to the optical receiver; and the lens corresponding to the optical transmitter is disposed in the second cavity 12, and is configured to transmit, to the WDM corresponding to the optical receiver, the light emitted by the optical transmitter. In FIG. 6, the XGPON receiver 21 corresponds to a lens 61, the GPON receiver 22 corresponds to a lens 62, the GPON transmitter 31 corresponds to a lens 63, and the XGPON transmitter 32 corresponds to a lens 64.

In FIG. 6, light that is sent from the optical fiber and that needs to be sent to the XGPON receiver 21 is reflected by the WDM 44 to reach the optical reflection component 51, is then reflected by the optical reflection component 51 to the WDM 43, is then reflected by the WDM 43 to the optical reflection component 51, is then reflected by the optical reflection component 51 to the WDM 42, is then reflected by the WDM 42 to the optical reflection component 51, is then reflected by the optical reflection component 51 to the WDM 41, and is then transmitted through the WDM 41 and transmitted through the lens 61 to reach the XGPON receiver 21.

Similarly, light that is emitted from the optical fiber and that needs to be sent to the GPON receiver 22 is reflected by the WDM 44 to reach the optical reflection component 51, is then reflected by the optical reflection component 51 to the WDM 43, is then reflected by the WDM 43 to the optical reflection component 51, is then reflected by the optical reflection component 51 to the WDM 42, and is then transmitted through the WDM 42 and transmitted through the lens 62 to reach the GPON receiver 22.

The light that is emitted by the GPON transmitter 31 is transmitted through the lens 63 and the WDM 43 to reach the optical reflection component 51, and is then sequentially reflected by the optical reflection component 51 and the WDM 44 to reach the optical fiber.

Similarly, the light emitted by the XGPON transmitter 32 is transmitted through the lens 64 and the WDM 44 to reach the optical fiber.

It should be understood arrangement manner of the WDMs and the optical reflection component 51 in the optical transceiver assembly in accordance with the present disclosure is not limited by this embodiment.

To implement the foregoing optical path transmission, optionally, the XGPON receiver 21, the GPON receiver 22, the GPON transmitter 31, and the XGPON transmitter 32 can be separately disposed on different optical axes parallel to each other. Preferably, the different optical axes are located in a same plane. Following the XGPON receiver 21, the lens 61 and the WDM 41 are disposed sequentially on the optical axis on which the XGPON receiver 21 is located. Following the GPON receiver 22, the lens 62 and the WDM 42 are disposed sequentially on the optical axis on which the GPON receiver 22 is located. Following the GPON transmitter 31, the lens 63 and the WDM 43 are disposed sequentially on the optical axis on which the GPON transmitter 31 is located. Following the XGPON transmitter 32, the lens 64 and the WDM 44 are disposed sequentially on the optical axis on which the XGPON transmitter 32 is located.

Three adjacent optical axes pass through the optical reflection component 51. The optical axis other than the three optical axes is coaxial with the optical fiber. FIG. 6 shows that the optical axis on which the XGPON transmitter 32 is located is coaxial with the optical fiber. The material of the optical reflection component 51 in accordance with the present disclosure is not limited by this embodiment of the present invention. For example, in some other embodiments, the optical reflection component 51 may be a total reflector. The optical reflection component 51 may alternatively be formed of three total reflectors. Certainly, the optical reflection component 51 may alternatively be formed of two total reflectors, provided that it is ensured that the three adjacent optical axes pass through the optical reflection component 51.

In some embodiments, the optical transceiver assembly may further include a ferrule 71, as shown in FIG. 6. The ferrule 71 is configured to connect to the optical fiber.

In some embodiments, the WDM 41 to the WDM 44 may be disposed in a straight line that is at a distance of L from the optical reflection component 51 and that is parallel to the optical reflection component 51. There is an angle $\theta$ between the straight line and any optical axis. $\theta$ is correlated to L and is correlated to a distance between any two adjacent optical axes. Certainly, the distance between any two optical axes cannot be less than a maximum size of sizes of the optical transmitter, the optical receiver, the lens, and the WDM.

Figure 6A:
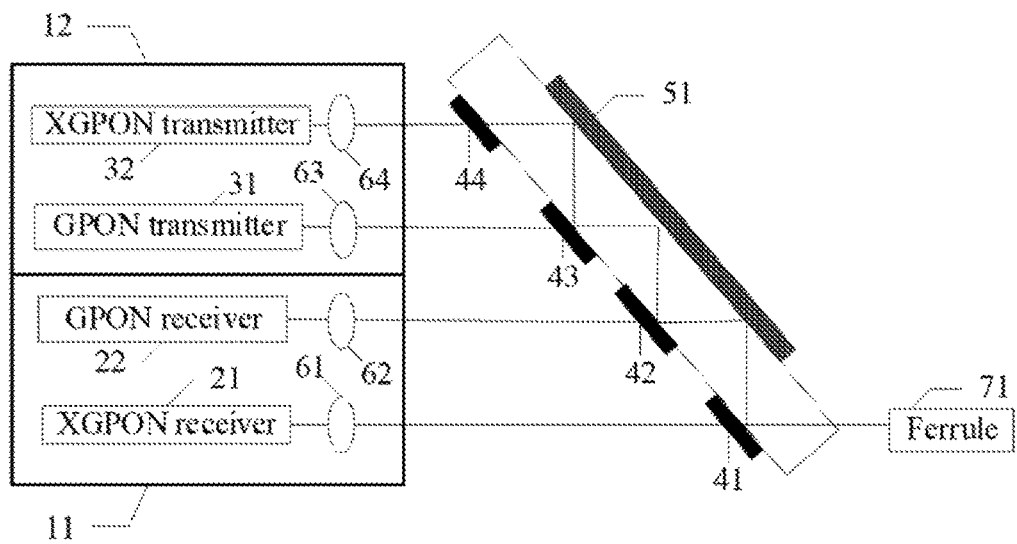
FIG. 6A is a schematic diagram 2 of an optical transceiver assembly according to an embodiment of the present invention.

Relative positions of the optical transmitter and the optical receiver on the optical transceiver assembly in accordance with the present disclosure are not limited by this embodiment of the present invention. In FIG. 6, the optical receiver is located above the optical transmitter. Theoretically, the optical transmitter can alternatively be located above the optical receiver, as shown in FIG. 6A. This embodiment of the present invention is described below by using an example in which the optical receiver is located above the optical transmitter.

In this embodiment of the present invention, all the WDMs and the optical reflection component 51 may be disposed outside the first cavity 11 and the second cavity 12. Alternatively, all the WDMs and the optical reflection component 51 are disposed in a third cavity other than the first cavity 11 and the second cavity 12. All the WDMs and the optical reflection component 51 may alternatively be disposed in the first cavity 11 or disposed in the second cavity 12.

Figure 7:
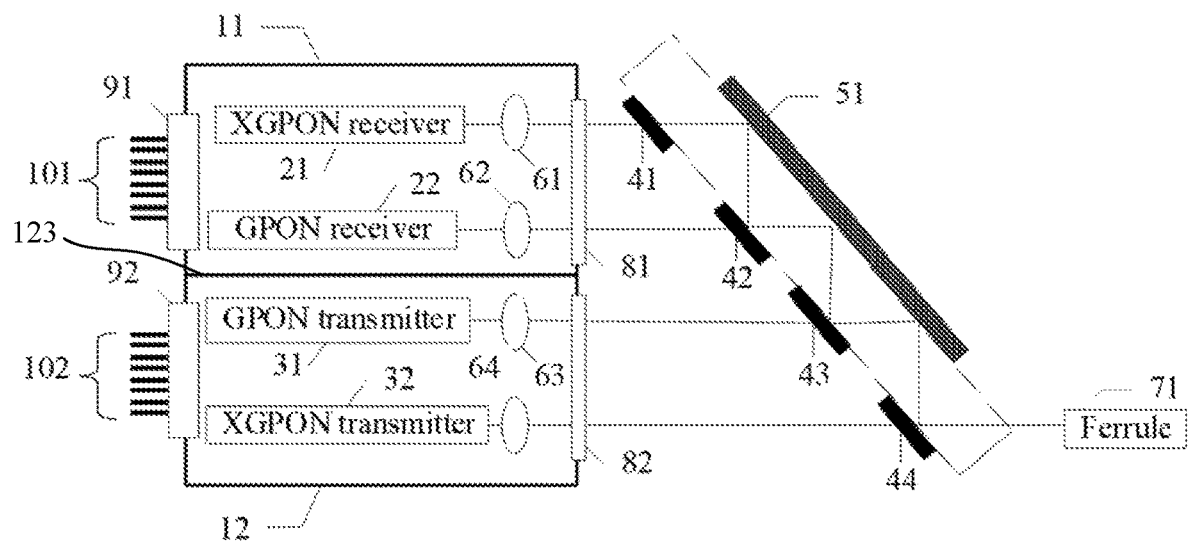
FIG. 7 is a schematic diagram 3 of an optical transceiver assembly according to an embodiment of the present invention.

The case in which all the WDMs and the optical reflection component 51 are disposed outside the first cavity 11 and the second cavity 12 is described below in detail, as shown in FIG. 7.

The first cavity 11 and the second cavity 12 are connected by using a common cavity wall. The common cavity wall may be a metal plate or a ceramic plate 123.

In the first cavity 11, a partial cavity wall on a side near the WDM (the WDM 41 or the WDM 42) corresponding to any optical receiver is a transparent plate 81. The transparent plate 81 in the first cavity 11 is configured to transmit, to the corresponding optical receiver, the light transmitted from the WDM corresponding to any optical receiver.

In the second cavity 12, a partial cavity wall on a side near the WDM (the WDM 43 or the WDM 44) corresponding to any optical transmitter is a transparent plate 82. The transparent plate 82 in the second cavity 12 is configured to transmit, to the corresponding WDM, the light emitted by any optical transmitter.

In the first cavity 11, ceramic 91 is disposed on a cavity wall on a side far away from the WDM corresponding to the optical receiver. Metal pins 101 are disposed on the ceramic 91 in the first cavity 11. The metal pins 101 are implanted in the first cavity 11 by using a vias in the ceramic 91 and are connected to one end of a lead disposed in the first cavity 11. The other end of the lead in the first cavity 11 is connected to the optical receiver.

In the second cavity 12, ceramic 92 is disposed on a cavity wall on a side far away from the WDM corresponding to the optical transmitter. Metal pins 102 are disposed on the ceramic 92 in the second cavity 12. The metal pins 102 are implanted in the second cavity 12 by using a vias in the ceramic 92, and are connected to one end of a lead disposed in the second cavity 12. The other end of the lead in the second cavity 12 is connected to the optical transmitter.

In some embodiments, the metal plate used as the common cavity wall between the first cavity 11 and the second cavity 12 is integrally connected to the first cavity 11 and the second cavity 12.

Figure 8:
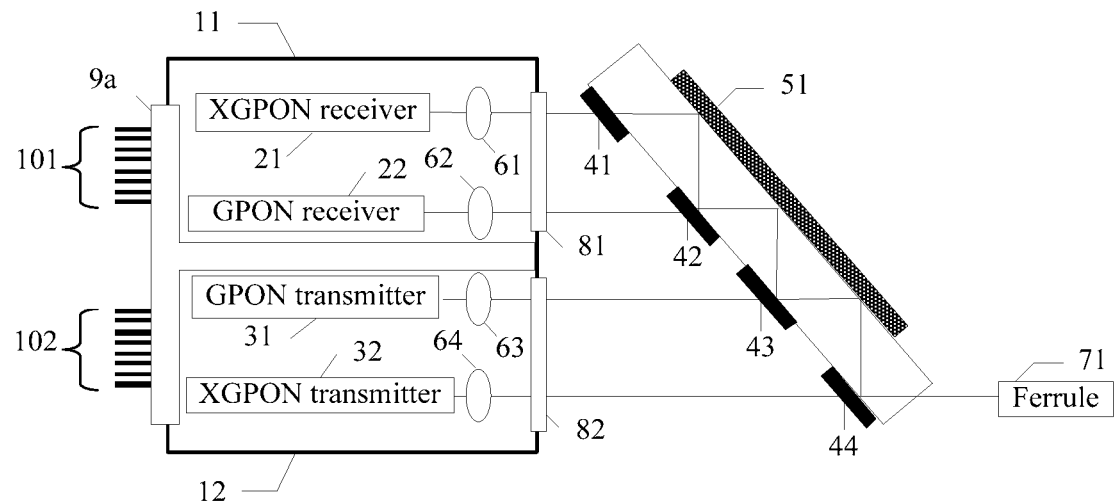
FIG. 8 is a schematic diagram 4 of an optical transceiver assembly according to an embodiment of the present invention.

In some embodiments, the ceramic plate 123 used as the common cavity wall between the first cavity 11 and the second cavity 12 is integrally connected to the ceramic 91 in the first cavity 11 and the ceramic 92 in the second cavity 12 to form ceramic 9a, as shown in FIG. 8.

Figure 9:
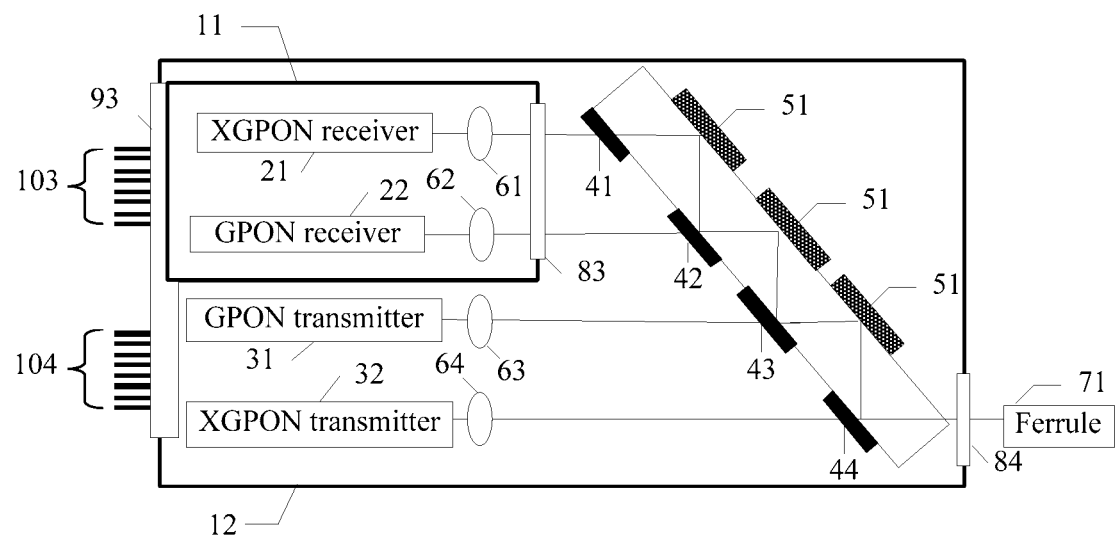
FIG. 9 is a schematic diagram 5 of an optical transceiver assembly according to an embodiment of the present invention.

The case in which all the WDMs and the optical reflection component 51 are disposed in the second cavity 12 is described below in detail, as shown in FIG. 9.

The first cavity 11, all the WDMs, and the optical reflection component 51 are all disposed in the second cavity 12.

In the first cavity 11, a partial cavity wall on a side near the WDM corresponding to the optical receiver is a transparent plate 83. Tha is, in the first cavity 11, the partial cavity wall on the side near the WDM 41 and the WDM 42 is the transparent plate 83. The transparent plate 83 in the first cavity 11 is configured to transmit, to the optical receiver, the light emitted from the WDM corresponding to the optical receiver. That is, the transparent plate 83 is configured to: transmit, to the XGPON receiver 21, the light emitted from the WDM 41, and transmit, to the GPON receiver 22, the light emitted from the WDM 42.

In the second cavity 12, a partial cavity wall on a side near the optical reflection component 51 is a transparent plate 84. The transparent plate 84 in the second cavity 12 is configured to transmit, to the WDM, the light emitted from the optical fiber, or is configured to transmit, to the optical fiber, the light transmitted or reflected from the WDM. In FIG. 9, the transparent plate 84 is configured to transmit, to the ferrule 71, the light transmitted from the WDM 44, or is configured to transmit, to the ferrule 71, the light reflected from the WDM 44, or is configured to transmit, through the ferrule 71, the light emitted from the optical fiber to the WDM 44.

In the second cavity 12, ceramic 93 is disposed on a cavity wall on a side far away from the optical reflection component 51. The ceramic 93 includes a first part 111 and a second part 112, as shown in FIG. 9A.

Figure 9A:
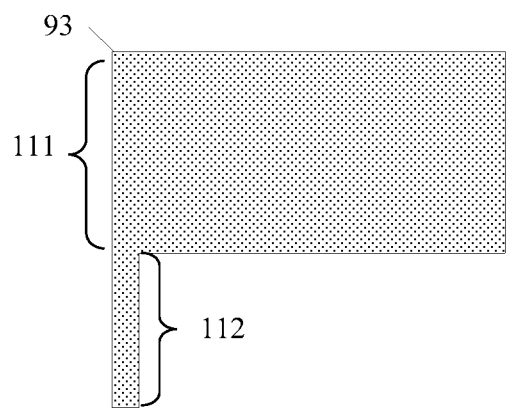
FIG. 9A is a schematic diagram of ceramic 93 in FIG. 9 according to an embodiment of the present invention.

As shown in FIG. 9A, metal pins 93 are disposed on the first part 111. The metal pins 93 on the first part 111 are implanted in the first cavity 11 by using a vias in the first part 111 and are connected to one end of a lead disposed in the first cavity 11. The other end of the lead in the first cavity 11 is connected to the optical receiver.

The second part 112 is used as a partial cavity wall, on a side far away from the WDM corresponding to the optical transmitter, of the second cavity 12. Metal pins 104 are disposed on the second part 112. The metal pins 104 on the second part 112 are implanted in the second cavity 12 by using a vias in the second part 112 and are connected to one end of a lead disposed in the second cavity 12. The other end of the lead in the second cavity 12 is connected to the optical transmitter.

Figure 10:
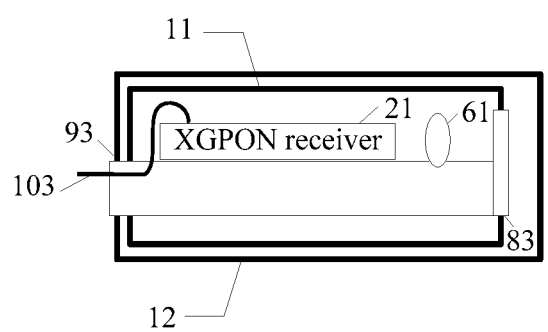
FIG. 10 is a partial schematic diagram 1 of FIG. 9 according to an embodiment of the present invention.
Figure 10A:
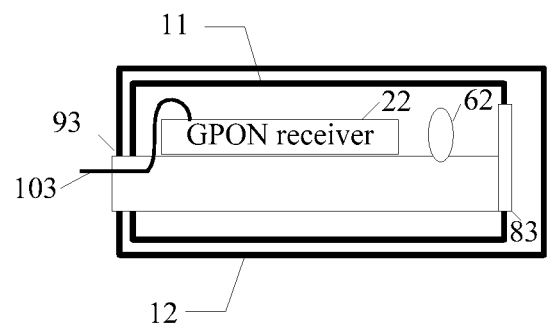
FIG. 10A is a partial schematic diagram 2 of FIG. 9 according to an embodiment of the present invention.

In some embodiments, as shown in FIG. 10 and FIG. 10A, the first cavity 11 may be disposed on the ceramic 93 extending from the second cavity 12, so that the lead of the metal pins 93 can pass through a lower surface of a layer of the ceramic 93, then enters an upper surface of the ceramic 93 in the first cavity 11 by using a vias in the ceramic 93, and is then connected to the XGPON receiver 21 and the GPON receiver 22.

Figure 11:
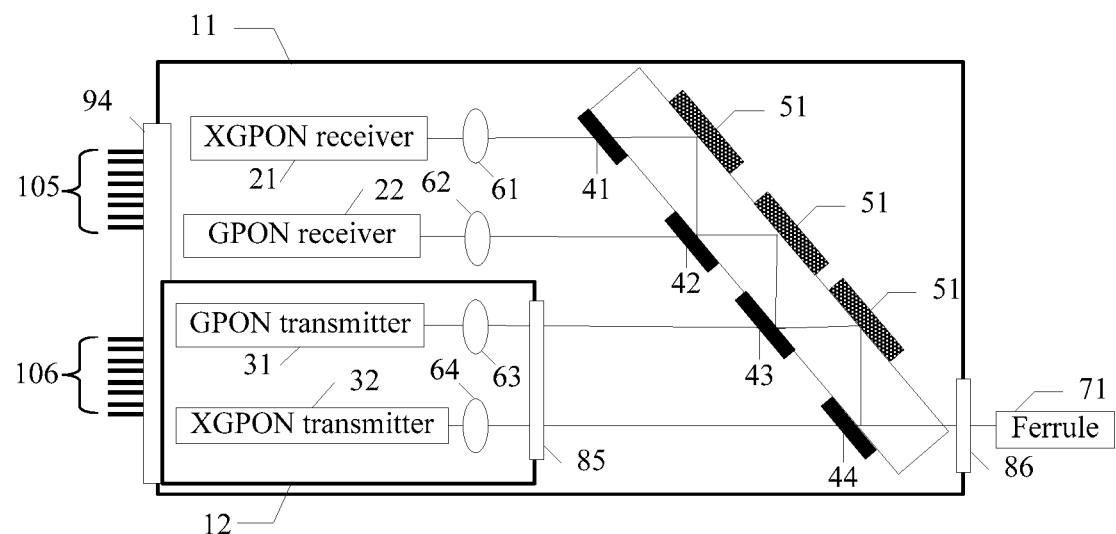
FIG. 11 is a schematic diagram 6 of an optical transceiver assembly according to an embodiment of the present invention.
Figure 11A:
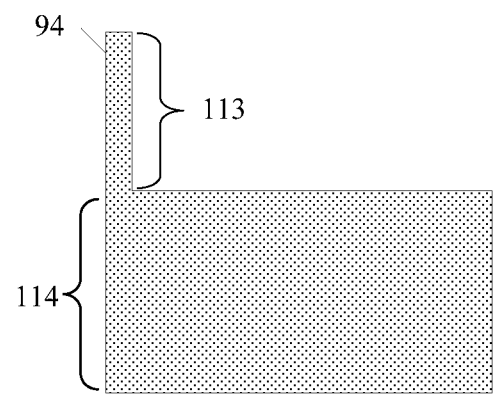
FIG. 11A is a schematic diagram of ceramic 94 in FIG. 9 according to an embodiment of the present invention.

The case in which all the WDMs and the optical reflection component 51 are disposed in the first cavity 11 is described below in detail, as shown in FIG. 11.

The second cavity 12, all the WDMs, and the optical reflection component 51 are disposed in the first cavity 11.

In the second cavity 12, a partial cavity wall on a side near the WDM corresponding to the optical transmitter is a transparent plate 85. The transparent plate 85 in the second cavity 12 is configured to transmit, to the WDM corresponding to the optical transmitter, the light emitted by the optical transmitter. In FIG. 11, the partial cavity wall, on the side near the WDM 43 and the WDM 44, of the second cavity 12 is the transparent plate 85. The transparent plate 85 is configured to: transmit, to the WDM 43, the light emitted by the GPON transmitter 31, and transmit, to the WDM 44, the light emitted by the XGPON transmitter 32.

In the first cavity 11, a partial cavity wall on a side near the optical reflection component 51 is a transparent plate 86. The transparent plate 86 in the first cavity 11 is configured to: transmit, to the WDM, the light emitted from the optical fiber or transmit, to the optical fiber, the light emitted from the WDM. In FIG. 11, the transparent plate 86 is configured to transmit, to the ferrule 71, the light transmitted from the WDM 44, or is configured to transmit, to the ferrule 71, the light reflected from the WDM 44, or is configured to transmit, by using the ferrule 71, the light emitted from the optical fiber to the WDM 44.

In the first cavity 11, ceramic 94 is disposed on a cavity wall on a side far away from the WDM corresponding to the optical receiver. The ceramic 94 in the first cavity 11 includes a first part 113 and a second part 114.

Metal pins 105 are disposed on the first part 113. The metal pins 105 on the first part 113 are implanted in the first cavity 11 by using a vias in the first part 113 and are connected to one end of a lead disposed in the first cavity 11. The other end of the lead in the first cavity 11 is connected to the optical receiver.

The second part 114 is used as a partial cavity wall, on a side far away from the WDM corresponding to the optical transmitter, of the second cavity 12. Metal pins 106 are disposed on the second part 114. The metal pins 106 on the second part 114 are implanted in the second cavity 12 by using a vias in the second part 114 and are connected to one end of a lead disposed in the second cavity 12. The other end of the lead in the second cavity 12 is connected to the optical transmitter.

Figure 12:
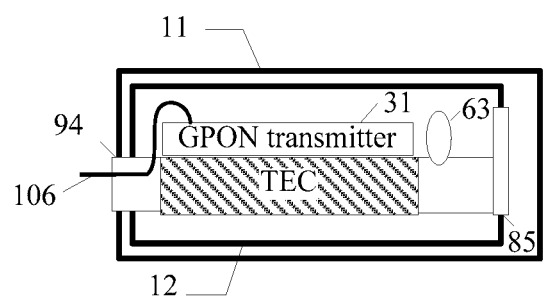
FIG. 12 is a partial schematic diagram 1 of FIG. 11 according to an embodiment of the present invention.
Figure 12A:
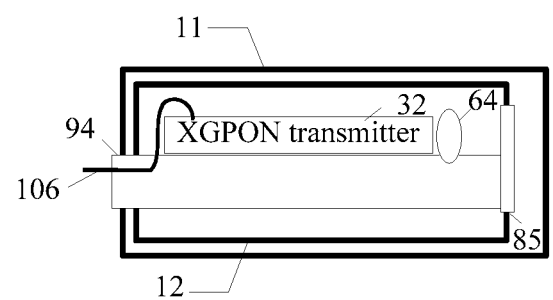
FIG. 12A is a partial schematic diagram 2 of FIG. 11 according to an embodiment of the present invention.

In some embodiments, as shown in FIG. 12 and FIG. 12A, the second cavity 12 may be disposed on the ceramic 94 extending from the first cavity 11, so that the lead of the metal pins 106 can pass through a lower surface of a layer of the ceramic 94, then enters an upper surface of the ceramic 94 in the second cavity 12 by using a vias in the ceramic 94, and is then connected to the GPON transmitter 31 and the XGPON transmitter 32. The GPON transmitter 31 has a relatively high temperature requirement. Therefore, a semiconductor cooler may be attached on a side of the GPON transmitter 31. The semiconductor cooler may be a TEC.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. An optical transceiver assembly, comprising a first cavity, a second cavity, and a set of wavelength division multiplexers (WDMs) including a first WDM and a second WDM, wherein:

the first cavity is air tight, and comprises at least two optical receivers, the at least two optical receivers being configured to receive light of different wavelengths, respectively; and the second cavity is air tight, and comprises at least two optical transmitters, the optical transmitters being configured to emit light of different wavelengths, respectively, wherein wavelengths of light received by the at least two optical receivers are different from wavelengths of light emitted by the at least two optical transmitters, and each optical receiver and each optical transmitter correspond to different WDMs in the set of WDMs, respectively, the first cavity and the second cavity are connected by a common cavity wall, in the first cavity, ceramic is disposed on a cavity wall on a side far away from the first WDM, metal pins are disposed on the ceramic in the first cavity, wherein the metal pins are implanted in the first cavity through a vias in the ceramic and are connected to one end of a lead disposed in the first cavity, and the other end of the lead in the first cavity is connected to the optical receiver; and in the second cavity, ceramic is disposed on a cavity wall on a side far away from the WDM corresponding to the optical transmitter, metal pins are disposed on the ceramic in the first cavity, the metal pins are implanted in the second cavity throug a vias in the ceramic and are connected to one end of a lead disposed in the second cavity, and the other end of the lead in the second cavity is connected to the optical transmitter;

the first WDM corresponds to one of the at least two optical receivers and is configured to: separate, from a light emitted from an optical fiber, a light having a wavelength recievable by the optical receiver corresponding to the WDM, transmit the light to the optical receiver corresponding to the first WDM, and reflect a light having the other wavelengths; and the second WDM corresponds to one of the at least two optical transmitters and is configured to: transmit a light having a wavelength emitted by the optical transmitter corresponding to the second WDM; and, wherein the optical transceiver assembly further comprises:

an optical reflection component, configured to totally reflect the light transmitted or reflected from the WDMs.

2. The optical transceiver assembly according to claim 1, further comprising:

lenses corresponding to each of the at least two optical receiver and each of the at least two optical transmitters, respectively, wherein the lens corresponding to the optical receiver is disposed in the first cavity, and is configured to transmit, to the optical receiver, the light emitted from the WDM corresponding to the optical receiver; and the lens corresponding to the optical transmitter is disposed in the second cavity, and is configured to transmit, to the WDM corresponding to the optical receiver, the light emitted by the optical transmitter.

3. The optical transceiver assembly according to claim 1, wherein the common cavity wall is a metal plate or a ceramic plate.

4. The optical transceiver assembly according to claim 1, wherein in the first cavity, a partial cavity wall on a side near the first WDM is a transparent plate, and the transparent plate in the first cavity is configured to transmit, to the optical receiver, the light transmitted from the first WDM; and in the second cavity, a partial cavity wall on a side near the second WDM is a transparent plate, and the transparent plate in the second cavity is configured to transmit, to the second WDM corresponding to the optical transmitter, the light emitted by the optical transmitter.

5. The optical transceiver assembly according to claim 1, wherein a ceramic plate is used as the common cavity wall between the first cavity and the second cavity and is integrally connected to the ceramic in the first cavity and the ceramic in the second cavity.

6. The optical transceiver assembly according to claim 1, wherein the WDMs and the optical reflection component are all disposed outside the first cavity and the second cavity.

7. The optical transceiver assembly according to claim 1, wherein the first cavity, the WDMs, and the optical reflection component are all disposed in the second cavity;

in the first cavity, a partial cavity wall on a side near the first WDM is a transparent plate, and the transparent plate in the first cavity is configured to transmit, to the optical receiver, the light emitted from the first WDM; and in the second cavity, a partial cavity wall on a side near the optical reflection component is a transparent plate, and the transparent plate in the second cavity is configured to transmit, to the second WDM, the light emitted from the optical fiber, or is configured to transmit, to the optical fiber, the light transmitted or reflected from the second WDM.

8. The optical transceiver assembly according to claim 7, wherein in the second cavity, ceramic is disposed on a cavity wall on a side far away from the optical reflection component, and the ceramic comprises a first part and a second part; and metal pins are disposed on the first part, wherein the metal pins on the first part are implanted in the second cavity through a vias in the first part and are connected to one end of a lead disposed in the second cavity, and the other end of the lead in the second cavity is connected to the optical transmitter; and the second part is used as a partial cavity wall, on a side far away from the first WDM, of the first cavity, wherein metal pins are disposed on the second part, the metal pins on the second part are implanted in the first cavity through a vias in the second part and are connected to one end of a lead disposed in the first cavity, and the other end of the lead in the first cavity is connected to the optical receiver.

9. The optical transceiver assembly according to claim 1, wherein the second cavity, the WDMs, and the optical reflection component are disposed in the first cavity;

in the second cavity, a partial cavity wall on a side near the first WDM is a transparent plate, wherein the transparent plate in the second cavity is configured to transmit, to the WDM corresponding to the optical transmitter, the light emitted by the optical transmitter; and in the first cavity, a partial cavity wall on a side near the optical reflection component is a transparent plate, wherein the transparent plate in the first cavity is configured to: transmit, to first the WDM, the light emitted from the optical fiber or transmit, to the optical fiber, the light emitted from the first WDM.

10. The optical transceiver assembly according to claim 9, wherein in the first cavity, ceramic is disposed on a cavity wall on a side far away from the first WDM, and the ceramic in the first cavity comprises a first part and a second part;

metal pins are disposed on the first part, the metal pins on the first part are implanted in the first cavity through a vias in the first part and are connected to one end of a lead disposed in the first cavity, and the other end of the lead in the first cavity is connected to the optical receiver; and the second part is used as a partial cavity wall, on a side far away from the second WDM, of the second cavity, metal pins are disposed on the second part, wherein the metal pins on the second part are implanted in the second cavity through a vias in the second part and are connected to one end of a lead disposed in the second cavity, and the other end of the lead in the second cavity is connected to the optical transmitter.

11. The optical transceiver assembly according to claim 1, wherein a semiconductor cooler is attached on a side of the optical transmitter.

* * * * *